United States Patent Office 3,445,511
Patented May 20, 1969

3,445,511
[4-(2,3-DIHALOALKANOYL)PHENOXY]
ALKANOIC ACIDS
Edward J. Cragoe, Jr., Lansdale, Pa., assignor to Merck & Co., Inc., Rahway, N.J., a corporation of New Jersey
No Drawing. Continuation-in-part of application Ser. No. 313,421, Oct. 3, 1963. This application Dec. 1, 1966, Ser. No. 598,202
Int. Cl. C07c 65/02; C07d 87/32, 29/20
U.S. Cl. 260—521
11 Claims

ABSTRACT OF THE DISCLOSURE

This invention relates to a new class of [4-(2,3-dihaloalkanoyl)phenoxyl]alkanoic acid products and to the salts, esters and amide derivatives thereof. The instant products are useful as diuretics and saluretics and, also, have utility as intermediates in the preparation of the diuretically active [4 - (2 - alkylidenealkanoyl)phenoxy]alkanoic acid compounds described in copending U.S. application Ser. No. 313,421, filed Oct. 3, 1963. The products of this invention are prepared by two routes: (1) via the Friedel-Crafts reaction of a 2,3-dihaloalkanoic acid halide with a phenoxyalkanoic acid and (2) via the treatment of a [4-(2-methylenealkanoyl)phenoxy]alkanoic acid with a suitable halogenating agent.

---

This application is a continuation-in-part of applicant's copending U.S. application Ser. No. 313,421, filed Oct. 3, 1963 and now abandoned.

This invention relates to a new class of chemical compounds which can be described generally as [4-(2,3-dihaloalkanoyl)phenoxy]acetic acids and to the nontoxic, pharmacologically acceptable salts, esters and amide derivatives thereof.

Pharmacological studies show that the instant products are effective diuretic and saluretic agents which can be used in the treatment of conditions associated with electrolyte and fluid retention and hypertension. When administered in therapeutic dosages, in conventional vehicles, the instant products effectively reduce the amount of sodium and chloride ions in the body, lower dangerous excesses of fluid levels to acceptable limits and, in general, alleviate conditions usually associated with edema.

The products of this invention are compounds having the following general formula:

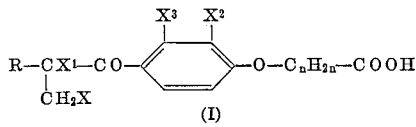

(I)

wherein R is lower alkyl, for example, methyl, ethyl, propyl, isopropyl, butyl, amyl, etc. or trifluoromethyl substituted lower alkyl, for example, 2,2,2-trifluoroethyl, 2,2,2-trifluoroisopropyl, etc.; X and $X^1$ represent halogen, for example, chloro, bromo, iodo, etc.; $X^2$ and $X^3$ represent similar or dissimilar members selected from hydrogen, halogen, for example, chloro, bromo, iodo, etc., lower alkyl, for example, methyl, ethyl, propyl, isopropyl, etc. and, taken together, the $X^2$ and $X^3$ radicals may be joined to form an hydrocarbylene chain, i.e., a divalent organic radical composed solely of carbon and hydrogen, containing from 3–4 carbon atoms between their points of attachment, for example, trimethylene, tetramethylene, 1,3-butadienylene, i.e., —CH=CH—CH=CH—, etc., and $n$ is an integer having a value of 1–3.

A preferred embodiment of this invention relates to [4-(2,3-dihaloalkanoyl)phenoxy]acetic acids having the following general formula:

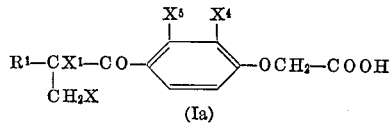

(Ia)

wherein $R^1$ is lower alkyl; $X^4$ and $X^5$ are similar or dissimilar members selected from hydrogen, halogen and lower alkyl and X and $X^1$ are as defined above. The foregoing class of compounds exhibits particularly good diuretic and saluretic activity and represents a preferred subgroup within the scope of this invention.

The [4-(2,3-dihaloalkanoyl) phenoxy]alkanoic acid products (I) of this invention are conveniently obtained by either of two alternate routes, one of which relates to the Friedel-Crafts reaction of an acid halide with a phenoxyalkanoic acid, and the second of which relates to the reaction of [4 - (2 - methylenealkanoyl)phenoxy] alkanoic acid with an halogenating agent.

The first of the aforementioned processes, that is, the Friedel-Crafts reaction, comprises treating a 2,3-dihaloalkanoic acid halide (II, infra) with an appropriate phenoxyalkanoic acid (III, infra) in the presence of aluminum chloride. The following equation, wherein the acid halide is 2,3-dihaloalkanoic acid chloride (II) illustrates this process; however, it is to be understood that other acid halides such as the corresponding 2,3-dihaloalkanoic acid bromide may also be employed in an otherwise analogous reaction to yield an identical product (I):

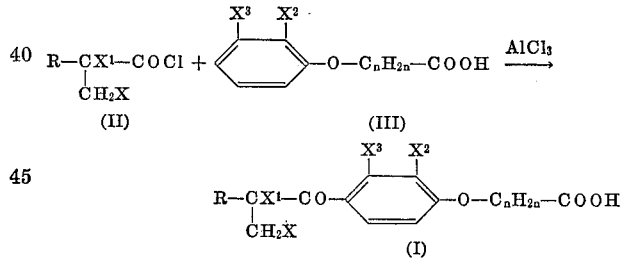

wherein R, X, $X^1$, $X^2$, $X^3$ and $n$ are as defined above. The reaction is most advantageously conducted in the presence of a solvent which is relatively inert with respect to the reactants employed as, for example, in carbon disulfide or methylene chloride and, also, with the application of heat.

The second method for the preparation of the instant products (I) comprises treating a [4 - (2 - methylenealkanoyl)phenoxy]alkanoic acid (IV, infra) or the corresponding ester or amide derivative thereof with an halogenating agent, preferably, in a suitably inert reaction medium such as chloroform. Reagents which are particularly suitable in effecting halogenation include, for example, chlorine, iodine monochloride, bromine solutions, etc.; however, it will be appreciated by those skilled in the art that other equivalent reagents may also be employed in an analogous manner to yield identical products. The following equation, wherein the starting material employed is a [4-(2-methylenealkanoyl)phenoxy]alkanoic acid (IV), illustrates this method of preparation; however, it is to be understood that the corresponding ester or amide derivative of the said acid (IV) may be substituted therefor in an otherwise analogous process to yield the corresponding esterified or amidated product:

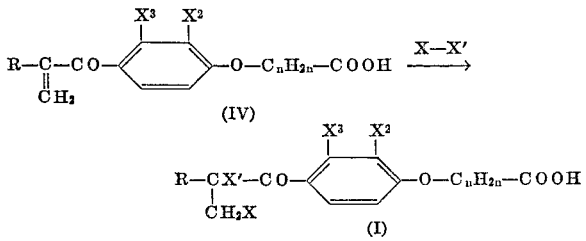

wherein R, X, $X^1$, $X^2$, $X^3$ and $n$ are as defined above.

The [4-(2,3-dihaloalkanoyl)phenoxy]alkanoic acids (I) of this invention and corresponding salts are generally obtained as crystalline solids and, if desired, may be purified by recrystallization from a suitable solvent such as benzene, hexane, butyl chloride, chloroform or mixtures thereof, such as mixtures of hexane and benzene, etc.

The 2,3-dihaloalkanoic acid halides (II) employed as starting materials in the first of the aforementioned preparative methods, i.e., the Friedel-Crafts reaction, are synthesized by treating an appropriately substituted acrylic acid (V, infra) with a suitable halogenating agent to obtain the corresponding 2,3-dihaloalkanoic acid (VI, infra), which intermediate is then treated with a second reagent such as thionyl chloride, to yield the desired acid halide (II). The following equation, wherein the reagent employed in preparing the acid halide is thionyl chloride, illustrates the reaction; however, it is to be understood that other equivalent reagents may also be employed in an otherwise analogous reaction to yield an identical compound (II):

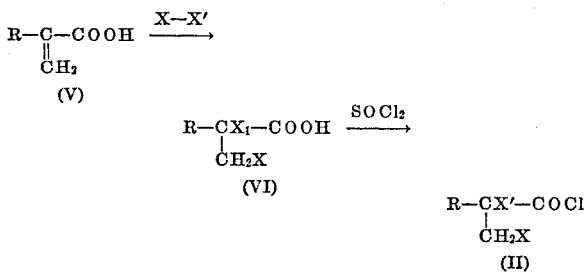

wherein R, X and $X^1$ are as defined above.

The [4-(2-methylenealkanoyl)phenoxy]alkanoic acid starting materials (IV) described above in connection with the second principal method for the preparation of the instant products (I) are the subject of U.S. Patent No. 3,255,241 issued June 7, 1966.

Included within this invention are the nontoxic, pharmacologically acceptable salts of the instant products (I) as, for example, the sodium, potassium or calcium salts and the ammonium, or lower alkylammonium salts thereof, etc., which may be obtained from the said [4-(2,3-dihaloalkanoyl)phenoxy]alkanoic acids (I) by conventional means.

This invention also relates to the preparation of ester and amide derivatives of the instant products (I) and includes all such derivatives as are compatible with the body system and whose pharmacological properties will not cause an adverse physiological effect. Esters and amides within this invention include, for example, the alkyl ester and the amide, monoalkylamide, dialkylamide and heterocyclic amide derivatives as, for example, amides derived from such heterocyclic amines as pyrrolidine, piperidine, morpholine, etc.; which esters and amides are prepared in the conventional manner from the corresponding [4-(2,3-dihaloalkanoyl)phenoxy]alkanoic acid (I) or from the acid halide derivative thereof by reaction with a suitable alcohol, ammonia, monoalkylamine, dialkylamine or heterocyclic amine.

The foregoing and other equivalent methods for the preparation of the salts, esters and amide derivatives of the instant products (I) will be apparent to those having ordinary skill in the art and, to the extent that the said derivatives are both nontoxic and physiologically acceptable to the body system, the said esters and amides are the functional equivalent of the corresponding [4-(2,3-dihaloalkanoyl)phenoxy]alkanoic acids (I).

The examples which follow illustrate the [4-(2,3-dihaloalkanoyl)phenoxy]alkanoic acids of this invention and the corresponding ester and amide derivatives thereof and, also, the methods by which they may be prepared. However, the examples are illustrative only and it will be apparent to those having ordinary skill in the art that all of the instant products may be produced in an analogous manner by substituting the appropriate starting materials for those set forth in the examples.

EXAMPLE 1

[2,3-dimethyl-4-[2-bromo-2-(bromomethyl)butyryl] phenoxy]acetic acid

Step A: 2-bromo-2-(bromomethyl)butyryl chloride.—2-bromo-2-(bromomethyl)butyric acid is heated with slightly more than one molar equivalent of thionyl chloride until the evolution of hydrogen chloride and sulfur dioxide ceases. The residue thus obtained is then fractionally distilled at reduced pressure to obtain 2-bromo-2-(bromomethyl)butyryl chloride.

Step B: [2,3-dimethyl-4-[2-bromo-2-(bromomethyl) butyryl]phenoxy]acetic acid.—(2,3-dimethylphenoxy) acetic acid (43.2 g., 0.24 mole) is added to a solution of 2-bromo-2-(bromomethyl)butyryl chloride (79.5 g., 0.3 mole) in carbon disulfide (240 ml.). Aluminum chloride is then added in small portions at 10° C. with mechanical stirring. After all of the aluminum chloride has been added, the mixture is stirred at about 25° C. for three hours and carbon disulfide is removed by decantation. The residue is added to a mixture of ice (1 kg.) and concentrated hydrochloric acid (30 ml.) and the product which separates is extracted with ether. The solid that separates upon evaporation of the ether is crystallized from a mixture of hexane and benzene to obtain pure [2,3-dimethyl-4-[2-bromo-2-(bromomethyl)butyryl] phenoxy]acetic acid, M.P. 124.5–126.5° C.

Analysis.—For $C_{15}H_{18}Br_2O_4$: Calculated: C, 42.68; H, 4.30; Br, 37.86. Found: C, 43.00; H, 4.53; Br, 37.78.

EXAMPLE 2

[2,3-dichloro-4-(2-chloro-2-chloromethylbutyryl) phenoxy]acetic acid

A solution of [2,3-dichloro-4-(2-methylenebutyryl) phenoxy]acetic acid (3.03 g., 0.01 mole) in chloroform (50 ml.) is treated for a few minutes with a stream of chlorine gas. Upon standing at room temperature for 10 minutes the solvent is removed by distillation under reduced pressure to give 3.6 g. (98%) of product, which, upon recrystallization from butyl chloride, yields pure [2,3-dichloro-4-(2-chloro-2-chloromethylbutyryl)phenoxy]acetic acid, M.P. 149.5–150.5° C.

Analysis.—For $C_{13}H_{12}Cl_4O_4$: Calculated: C, 41.74; H, 3.23; Cl, 37.92. Found: C, 42.00; H, 3.25; Cl, 37.65.

EXAMPLE 3

[2,3-dichloro-4-(2-iodo-2-chloromethylbutyryl) phenoxy]acetic acid

A solution of [2,3-dichloro-4-(2-methylenebutyryl) phenoxy]acetic acid (3.03 g., 0.01 mole) in chloroform (40 ml.) is treated over a period of 10 minutes with iodine monochloride (0.5 ml., 0.01 mole) in chloroform (10 ml.). After two hours the product which separates (3.2 g., 69%) is collected by filtration and recrystallized from benzene to yield [2,3-dichloro-4-(2-iodo-2-chloromethylbutyryl)phenoxy]acetic acid, M.P. 160-161° C.

*Analysis.*—For $C_{13}H_{12}Cl_3IO_4$: Calculated: C, 33.54; H, 2.60; Cl, 22.58. Found: C, 34.06; H, 2.92; Cl, 22.42.

EXAMPLE 4

[2,3-dichloro-4-(2-bromo-2-bromomethylisovaleryl) phenoxy]acetic acid

A solution of [2,3-dichloro-4-(2-methyleneisovaleryl)-phenoxy]acetic acid (1.0 g., 0.00315 mole) in chloroform (10 ml.) is treated with bromine (5.05 mg., 0.00315 mole in chloroform (5 ml.). The reaction is heated at reflux for 10 minutes and the solvent removed by distillation at reduced pressure. Recrystallization of the residue from butyl chloride (40 ml.) yields 1.0 g. (67%) of [2,3-dichloro-4-(2-bromo-2-bromomethylisovaleryl) phenoxy]acetic acid, M.P. 156-157.5° C.

*Analysis.*—For $C_{14}H_{14}Br_2Cl_2O_4$: Calculated: C, 32.25; H, 2.96; Br, 33.51; Cl, 14.87. Found: C, 35.47; H, 3.13; Br, 33.48; Cl, 14.64.

EXAMPLE 5

[2,3-dichloro-4-(2-bromo-2-bromomethylbutyryl) phenoxy]acetic acid

A solution of [2,3-dichloro-4-(2-methylenebutyryl) phenoxy]acetic acid (6.06 g., 0.02 mole) in chloroform (50 ml.) is treated over 10 minutes with a solution of bromine (1.1 ml., 0.02 mole) in chloroform (10 ml.). After 0.5 hour the product that separates (6.1 g., 67%) is isolated by filtration and recrystallized from chloroform to yield [2,3-dichloro-4-(2-bromo-2-bromomethylbutyryl) phenoxy]acetic acid, M.P. 155-155.5° C.

*Analysis.*—For $C_{13}H_{17}Br_2Cl_2O_4$: Calculated: C, 33.72; H, 2.61; Br, 34.52; Cl, 15.32; Found: C, 33.56; H, 2.73; Br, 34.33; Cl, 15.11.

EXAMPLE 6

Ethyl[3-chloro-4-(2-bromo-2-bromomethylbutyryl) phenoxy]-acetate

By substituting ethyl 3-chloro-4-(2-methylenebutyryl)-phenoxy acetate for the [2,3-dichloro-4-(2-methylenebutyryl)-phenoxy]acetic acid of Example 5 and following the procedure described therein the product ethyl [3-chloro-4-(2-bromo-2-bromomethylbutyryl)phenoxy] acetate is obtained.

EXAMPLE 7

[3-chloro-4-(2-bromo-2-bromomethylbutyryl) phenoxy]acetamide

By substituting [3-chloro-4-(2-methylenebutyryl)phenoxy]acetamide for the [2,3-dichloro-4-(2-methylenebutyryl)-phenoxy]acetic acid of Example 5 and following the procedure described therein the product [3-chloro-4-(2-bromo-2-bromomethylbutyryl)phenoxy]acetamide is obtained.

In a manner similar to that described in Example 5 for the preparation of [2,3-dichloro-4-(2-bromo-2-bromomethylbutyryl)phenoxy]acetic acid all of the products of this invention may be obtained. Thus, by substituting an appropriate [4-(2-methylenealkanoyl)phenoxy]alkanoic acid (IV) and a suitable halogenating agent for the [2,3-dichloro-4-(2-methylenebutyryl)phenoxy]acetic acid and the bromine solution recited therein and following the procedure there described all of the [4-(2,3-dihaloalkanoyl)phenoxy]alkanoic acid products (I) of this invention may be obtained. The following equation illustrates, in general, the reaction of Example 5 and, together with with Table I (infra), depict the [4-(2-methylenealkanoyl) phenoxy]alkanoic acid starting materials of the instant process and the corresponding products (I) derived therefrom:

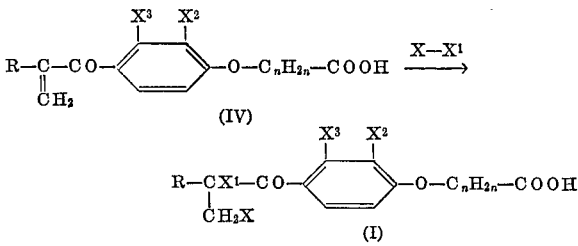

TABLE I

| Ex. | R | X | $X^1$ | $X^2$ | $X^3$ | $-C_nH_{2n}-$ | Halogenating Agent |
|---|---|---|---|---|---|---|---|
| 8 | $-C_2H_5$ | Cl | Cl | H | Cl | $-CH_2-$ | $Cl_2$ (gas). |
| 9 | $-C_2H_5$ | Br | Br | $-CH=CH-CH=CH-$ | | $-CH_2-$ | $Br_2$ (soln.). |
| 10 | $-C_2H_5$ | Cl | Cl | Cl | $-CH_3$ | $-CH_2-$ | $Cl_2$ (gas). |
| 11 | $-C_2H_5$ | Cl | Cl | $-CH_3$ | Cl | $-CH_2-$ | $Cl_2$ (gas). |
| 12 | $-CH_2-CF_3$ | Br | Br | $-CH_3$ | $-CH_3$ | $-CH_2-$ | $Br_2$ (soln.). |
| 13 | $-CH(CH_3)(CF_3)$ | Br | Br | H | $-CH_3$ | $-CH_2-$ | $Br_2$ (soln.). |
| 14 | $-CH(CH_3)_2$ | Br | Br | H | Cl | $-CH_2-$ | $Br_2$ (soln.). |
| 15 | $-CH(CH_3)_2$ | Cl | Cl | Cl | Cl | $-CH_2-$ | $Cl_2$ (gas). |
| 16 | $-C_2H_5$ | Cl | Cl | H | $-CH_3-$ | $-CH_2-$ | $Cl_2$ (gas). |
| 17 | $-C_2H_5$ | Br | Br | $-CH_2-CH_2-CH_2-$ | | $-CH_2-$ | $Br_2$ (soln.). |
| 18 | $-CH_3$ | Cl | Cl | H | Cl | $-CH(CH_3)-$ | $Cl_2$ (gas). |
| 19 | $-CH_3$ | Br | Br | H | Cl | $-CH_2-CH_2-$ | $Br_2$ (soln.). |
| 20 | $-C_2H_5$ | Br | Br | $-CH_2-CH_2-CH_2-CH_2-$ | | $-CH_2-$ | $Br_2$ (soln.). |
| 21 | $-(CH_2)_4CH_3$ | Br | Br | H | Cl | $-CH_2-$ | $Br_2$ (soln.). |
| 22 | $-C_2H_5$ | Cl | Cl | H | I | $-CH_2-$ | $Cl_2$ (gas). |
| 23 | $-C_2H_5$ | Br | Br | H | H | $-CH_2-$ | $Br_2$ (soln.). |

In addition to their pharmacological activity the products (I) of this invention are useful as intermediates in preparing the diuretically active [4-(2-methylenealkanoyl)phenoxy]alkanoic acids described in U.S. Patent No. 3,255,241, issued June 7, 1966. The significance of this utility will be appreciated by those skilled in the art inasmuch as the said [4-(2,3-dihaloalkanoyl)phenoxy] alkanoic acids constitute a highly effective class of diuretics which, by virtue of this invention, can be conveniently synthesized via the two-step process of (1) treating a 2,3-dihaloalkanoic acid halide with a phenoxyalkanoic acid according to the Friedel-Crafts reaction described hereinabove for preparing the instant [4-(2,3-dihaloalkanoyl)phenoxy]alkanoic acid products and (2) treating the latter with a dehalogenating agent according to the method described in Canadian Patent No. 727,148 to yield the corresponding [4-(2-methylenealkanoyl)phenoxy]alkanoic acid. Potassium iodide has proved to be a particularly suitable reagent for converting the instant products (I) to the said [4-(2-methylenealkanoyl)phenoxy]-alkanoic acids but, in general, any reagent which is a source for iodide ions in solution may be used with similar results. However, when potassium iodide or its equivalent is employed it is advantageous to conduct the reaction in the presence of a reagent which will remove the iodine produced during the reaction; such reagents include, for example, sodium thiosulfate, sodium hypophosphate, sodium hyposulfite, sodium bisulfite, etc.

The products of the invention can be administered in a wide variety of therapeutic dosages in conventional vehicles as, for example, by oral administration in the form of a capsule or tablet as well as by intravenous injection. Also, the dosage of the products may be varied over a wide range as, for example, in the form of capsules or scored tablets containing 5, 10, 20, 25, 50, 100, 150, 250 and 500 milligrams, i.e., from 5 to about 500 milligrams, of the active ingredient for the symptomatic adjustment of the dosage to the patient to be treated. These dosages are well below the toxic or lethal dose of the products.

A suitable unit dosage form of the products of this invention can be prepared by mixing 50 mg. of a [4-(2,3-dihaloalkanoyl)phenoxy]alkanoic acid or a suitable acid addition salt, ester or amide derivative thereof, with 144 mg. of lactose and 6 mg. of magnesium stearate and placing the 200 mg. mixture into a No. 3 gelatin capsule. Similarly, by employing more of the active ingredient and less lactose, other dosage forms can be put up in No. 3 gelatin capsules and, should it be necessary to mix more than 200 mg. of ingredients together, larger capsules may be employed. Compressed tablets, pills or other desired unit dosages can be prepared to incorporate the compounds of this invention by conventional methods and, if desired, can be made up as elixirs or as injectable solutions by methods well known to pharmacists.

It is also within the scope of this invention to combine two or more of the compounds of this invention in a unit dosage form or to combine one or more of the compounds with other known diuretics and saluretics or with other desired therapeutic and/or nutritive agents in dosage unit form.

The following example is included to illustrate the preparation of a representative dosage form:

EXAMPLE 24

Dry-filled capsules containing 50 mg. of active ingredient per capsule

| | Per capsule, mg. |
|---|---|
| [2,3 - dichloro - 4-(2-bromo-2-bromomethylbutyryl)phenoxy]acetic acid | 50 |
| Lactose | 144 |
| Magnesium stearate | 6 |
| Capsule size No. 3 | 200 |

The [2,3-dichloro-4-(2-bromo-2-bromomethylbutyryl)phenoxy]acetic acid is reduced to a No. 60 powder and then lactose and magnesium stearate are passed through a No. 60 bolting cloth onto the powder and the combined ingredients admixed for 10 minutes and then filled into No. 3 dry gelatin capsules.

Similar dry-filled capsules can be prepared by replacing the active ingredient of the above example by any of the other novel compounds of this invention.

It will be apparent from the foregoing description that the [4-(2,3-dihaloalkanoyl)phenoxy]alkanoic acid products of this invention and their salt, ester and amide derivatives constitute a valuable class of compounds which have not been prepared heretofore. One skilled in the art will also appreciate that the processes disclosed in the above examples are merely illustrative and are capable of a wide variation and modification without departing from the spirit of this invention.

What is claimed is:

1. A compound having the formula:

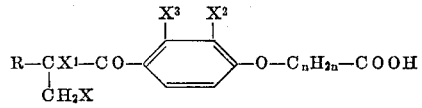

wherein R is lower alkyl or trifluoromethyl substituted lower alkyl; X and $X^1$ are halogen; $X^2$ and $X^3$ are selected from hydrogen, halogen, lower alkyl or, taken together, $X^2$ and $X^3$ may be joined to form a hydrocarbylene chain selected from trimethylene, tetramethylene and 1,3-butadienylene and $n$ is an integer having a value of 1–3; and the nontoxic, pharmacologically acceptable salts, lower alkyl esters and amide, alkylamide, dialkylamide, pyrrolidide, piperidide and morpholidide derivatives thereof.

2. A compound having the formula:

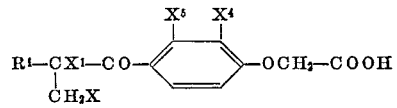

wherein $R^1$ is lower alkyl: X and $X^1$ are halogen and $X^4$ and $X^5$ are selected from hydrogen, halogen and lower alkyl.

3. A compound according to claim 2 wherein $X^4$ and $X^5$ are halogen.

4. A compound according to claim 2 wherein X and $X^1$ are bromo and $X^4$ and $X^5$ are chloro.

5. A compound according to claim 2 wherein $X^4$ and $X^5$ are lower alkyl.

6. A compound according to claim 2 wherein $X^4$ is chloro and $X^5$ is methyl.

7. A compound according to claim 2 wherein $X^4$ is methyl and $X^5$ is chloro.

8. A compound according to claim 2 wherein $X^4$ is hydrogen and $X^5$ is chloro.

9. A compound according to claim 1 wherein R is lower alkyl and $X^2$ and $X^3$ are joined to form 1,3-butadienylene and $n$ is an integer having a value of 1.

10. [2,3 - dichloro-4-(2-chloro-2-chloromethylbutyryl)-phenoxy]acetic acid.

11. [2,3 - dichloro-4-(2-bromo-2-bromomethylbutyryl)-phenoxy]acetic acid.

References Cited

Belyakova et al.: Chem. Abstracts, vol. 53, p. 3135.

LORRAINE A. WEINBERGER, Primary Examiner.

J. H. NIELSEN, Assistant Examiner.

U.S. Cl. X.R.

260—247.7, 294.7, 326.5, 473, 501.16, 520, 559; 424—317